(12) United States Patent
Cho et al.

(10) Patent No.: US 8,119,059 B2
(45) Date of Patent: Feb. 21, 2012

(54) APPARATUS FOR MANUFACTURING MOLTEN IRONS

(75) Inventors: Min-Young Cho, Pohang-shi (KR);
Hang-Goo Kim, Pohang-shi (KR);
Myoung-Kyun Shin, Pohang-shi (KR);
Nag-Joon Choi, Pohang-shi (KR);
Kung-Won Nam, Pohang-shi (KR);
Sun-Kwang Jeong, Pohang-shi (KR);
Jun-Hyuk Lee, Pohang-shi (KR)

(73) Assignees: POSCO, Pohang (KR); Siemens VAI Metals Technologies GmbH & Co., Linz (AU)

( * ) Notice: Subject to any disclaimer, the term of this patent is extended or adjusted under 35 U.S.C. 154(b) by 833 days.

(21) Appl. No.: 12/158,926

(22) PCT Filed: Dec. 26, 2006

(86) PCT No.: PCT/KR2006/005699
§ 371 (c)(1),
(2), (4) Date: Jun. 23, 2008

(87) PCT Pub. No.: WO2007/075022
PCT Pub. Date: Jul. 5, 2007

(65) Prior Publication Data
US 2009/0008841 A1    Jan. 8, 2009

(30) Foreign Application Priority Data

Dec. 26, 2005   (KR) .................. 10-2005-0130116

(51) Int. Cl.
*C22B 1/10* (2006.01)

(52) U.S. Cl. ........ 266/172; 266/144; 266/168; 266/169; 75/453; 75/754; 95/271

(58) Field of Classification Search .................. 266/172, 266/217–266, 144, 168–169; 75/10.39, 10.4, 75/10.45, 10.62, 10.63, 443–458, 463, 754; 95/271
See application file for complete search history.

(56) References Cited

U.S. PATENT DOCUMENTS
2,108,592 A * 2/1938 Mullen ..................... 423/110
(Continued)

FOREIGN PATENT DOCUMENTS
DE    10343582 A1    5/2005
(Continued)

*Primary Examiner* — Roy King
*Assistant Examiner* — Lois Zheng
(74) *Attorney, Agent, or Firm* — The Webb Law Firm

(57) ABSTRACT

An apparatus for manufacturing molten iron includes i) at least one fluidized-bed reduction reactor that converts iron ore into reduced materials by reducing and plasticizing the iron ore, ii) a melter-gasifier into which the reduced materials are charged and oxygen is injected such that the melter-gasifier manufactures molten iron, and iii) a reducing gas supply line that supplies a reducing gas discharged from the melter-gasifier into the fluidized-bed reduction reactor. The fluidized-bed reduction reactor includes a gas injector that injects a gas into the fluidized-bed reduction reactor to remove stagnating layers.

9 Claims, 4 Drawing Sheets

| U.S. PATENT DOCUMENTS | | | |
|---|---|---|---|
| 3,449,062 A | 6/1969 | Reh et al. | |
| 4,146,369 A | 3/1979 | Flesch et al. | |
| 5,584,910 A | 12/1996 | Kepplinger et al. | |
| 5,762,681 A * | 6/1998 | Lee et al. | 75/446 |
| 5,948,139 A | 9/1999 | Kepplinger et al. | |
| 6,585,798 B2 | 7/2003 | Choi et al. | |
| 6,736,876 B1 | 5/2004 | Shin et al. | |
| 7,713,329 B2 | 5/2010 | Shin et al. | |
| 2006/0119023 A1 | 6/2006 | Shin et al. | |

| FOREIGN PATENT DOCUMENTS | | | |
|---|---|---|---|
| EP | 0139092 | A1 | 5/1985 |
| JP | 1100227 | A | 4/1989 |
| JP | 2004150744 | A | 5/2004 |
| JP | 2005273999 | A | 10/2005 |
| KR | 20050089836 | A | 9/2005 |
| WO | 0146478 | A2 | 6/2001 |
| WO | 2004057038 | A1 | 7/2004 |

* cited by examiner

APPARATUS FOR MANUFACTURING MOLTEN IRONS

BACKGROUND OF THE INVENTION

1. Technical Field

The present invention relates an apparatus for manufacturing molten iron using powder ore in a smelting reduction process. The apparatus restrains a phenomenon in which the powder ore is piled up between a lower portion and an inner wall of the fluidized-bed reduction reactor to form stagnating layers, disturb gas flow, and deteriorate reaction efficiency.

2. Background Art

The iron and steel industry is a core industry that supplies the basic materials needed in construction and in the manufacture of automobiles, ships, home appliances, and many of the other products we use. It is also an industry with one of the longest histories that has progressed together with humanity. In an iron foundry, which plays a pivotal role in the iron and steel industry, after molten iron, which is pig iron in a molten state, is produced by using iron ore and coal as raw materials, steel is produced from the molten iron and then supplied to customers.

At present, approximately 60% of the world's iron production is realized by using the blast furnace process developed from the 14th century. In the blast furnace process, coke produced by using bituminous coal and iron ore that have undergone a sintering process are charged into a blast furnace, and hot gas is supplied to the blast furnace to reduce the iron ore to iron, to thereby manufacture molten iron.

The blast furnace method, which is the most popular in plants for manufacturing molten iron, requires that raw materials have strength of at least a predetermined level and have grain sizes that can ensure permeability in the furnace, taking into account reaction characteristics. For that reason, coke that is obtained by processing specific raw coals is needed as a carbon source to be used as a fuel and as a reducing agent. Also, sintered ore that have gone through a successive agglomerating process is needed as an iron source.

Accordingly, the modern blast furnace method requires raw material preliminary processing equipment, such as coke manufacturing equipment and sintering equipment. Namely, it is necessary to be equipped with subsidiary facilities in addition to the blast furnace, and also equipment for preventing and minimizing pollution generated by the subsidiary facilities. Therefore, a heavy investment in the additional facilities and equipment leads to increased manufacturing costs.

In order to solve the above problems of the blast furnace process, a smelting reduction process has been developed and researched by many countries. In the smelting reduction process, molten iron is manufactured in a melter-gasifier by directly using raw coal as a fuel and a reducing agent, and powder ore that makes up 80% or more of the world ore production as an iron source.

In the smelting reduction process, a two step reducing method composed of preliminary reducing and final reducing is considered to be mainstream. The conventional apparatus for manufacturing molten iron consists of a fluidized-bed reduction reactor in which bubble fluidized beds are formed and a melter-gasifier connected to the fluidized-bed reduction reactor, in which coal packed beds are formed. The powder ore and the additives at room temperature are charged into the fluidized-bed reduction reactor and pre-reduced.

Since hot reducing gas is supplied to the fluidized-bed reactors, the temperature of the iron ore and additives is raised by contacting with the hot reducing gas. Simultaneously, 90% or more of the iron ore and additives are reduced and 30% or more of them are plasticized, and they are charged into the melter-gasifier.

Meanwhile, in the fluidizing reduction process, the powder ore charged into the fluidized-bed reduction reactor goes through a process of rising and reducing in height by the reducing gas supplied from the melter-gasifier. The powder ore rises to a certain height depending on its properties such as particle size, density, and so on. Then, the powder ore generally drops again along an inner wall of the fluidized-bed reduction reactor where few gas streams exist.

However, when the gas flow of the reactor is not smoothly formed due to various reasons such as a sudden change of the gas stream during the operation, the dropped powder ore may not rise again and it may pile up between a lower portion and an inner wall of the fluidized-bed reduction reactor to form a layer.

As described above, the layer formed between the lower portion and the inner wall of the fluidized-bed reduction reactor is called a stagnating layer. In particular, when the operation instability lasts or an impact by the fluctuation of the gas stream is too great, the powder ore forming the stagnating layers will not rise again. Thus, the stagnating layers disturb the flow of the powder ore and the gas in the fluidized-bed reduction reactor.

As described above, the abnormal flow of the powder ore and the gas caused by the stagnating layers allows the stagnating layers to grow more. It also causes a vicious circle in which the flow of the powder ore and the gas is further disturbed. Thus, the normal function of the fluidized-bed reduction reactor is seriously deteriorated.

The present invention is for providing an apparatus for manufacturing molten iron that can restrain abnormal formation of stagnating layers of powder ore in a smelting reduction process.

SUMMARY OF THE INVENTION

An apparatus for manufacturing molten iron according to an exemplary embodiment of the present invention includes i) at least one fluidized-bed reduction reactor that converts iron ore into reduced materials by reducing and plasticizing the iron ore, ii) a melter-gasifier into which the reduced materials are charged and oxygen is injected such that the melter-gasifier manufactures molten iron, and iii) a reducing gas supply line that supplies a reducing gas discharged from the melter-gasifier into the fluidized-bed reduction reactor. The fluidized-bed reduction reactor includes a gas injector that injects a gas into the fluidized-bed reduction reactor to remove stagnating layers.

The gas injector may inject the gas in two or more directions that are different from each other.

The gas injector may include i) a gas supply line that supplies the gas into the fluidized-bed reduction reactor, and ii) a plurality of distribution nozzles that are connected to the gas supply line and that inject the gas in directions that are different from each other.

In addition, the gas injector may include i) a first distribution nozzle that is formed to be perpendicular to the gas supply line, ii) a second distribution nozzle that is formed to be perpendicular to the gas supply line and the first distribution nozzle, and iii) a third distribution nozzle that is formed to be perpendicular to the gas supply line and the second distribution nozzle.

The gas injector may include a downward distribution nozzle that is inclined in a direction extended from the gas supply line to the lower portion of the fluidized-bed reduction reactor.

The fluidized-bed reduction reactor may include a distribution plate through which the reducing gas passes, the distribution plate distributing the reducing gas. The gas injector may be arranged above the distribution plate.

In addition, a plurality of the gas injectors may be spaced apart from each other with a predetermined distance, and surround the fluidized-bed reduction reactor.

The fluidized-bed reduction reactor may include i) a powder ore charging passage that charges the powder ore thereinto, the powder ore charging passage provided in one side of the fluidized-bed reduction reactor, and ii) a powder ore discharging passage that discharges the powder ore therefrom, the powder ore discharging passage provided in the other side of the fluidized-bed reduction reactor. The gas injector may include i) a plurality of first gas injectors that are arranged above the distribution plate to remove the stagnating layers formed at a lower portion of the fluidized-bed reduction reactor, ii) a plurality of second gas injectors that are arranged above the first gas injector and below the powder ore charging passage to allow the powder ore to be smoothly charged, and iii) a plurality of third gas injectors that are arranged above the second gas injector and below the powder ore discharging passage, and that distribute the powder ore.

In addition, the fluidized-bed reduction reactor may further include at least one cyclone that collects fine ore therein, and the third gas injectors may be installed at substantially the same height as the height of the lower end portion of the cyclone.

In addition, the gas may include at least one gas selected from the group consisting of nitrogen, the reducing gas, and a residual gas generated from the apparatus for manufacturing iron.

In the apparatus for manufacturing molten iron according to the exemplary embodiment of the present invention, the formation of the stagnating layers is restrained in the fluidized-bed reduction reactor in the fluidizing reduction process in which the powder ore are used. Accordingly, the fluidization of the powder ore and the gas can be uniformly maintained.

In addition, the powder ore can be charged into the fluidized-bed reduction reactor smoothly, and the powder ore discharged from the cyclone can be effectively distributed.

DETAILED DESCRIPTION OF THE INVENTION

Embodiments of the present invention are explained below with reference to FIGS. 1 to 5. The embodiments are merely to illustrate the present invention and the present invention is not limited thereto.

Figure 1:
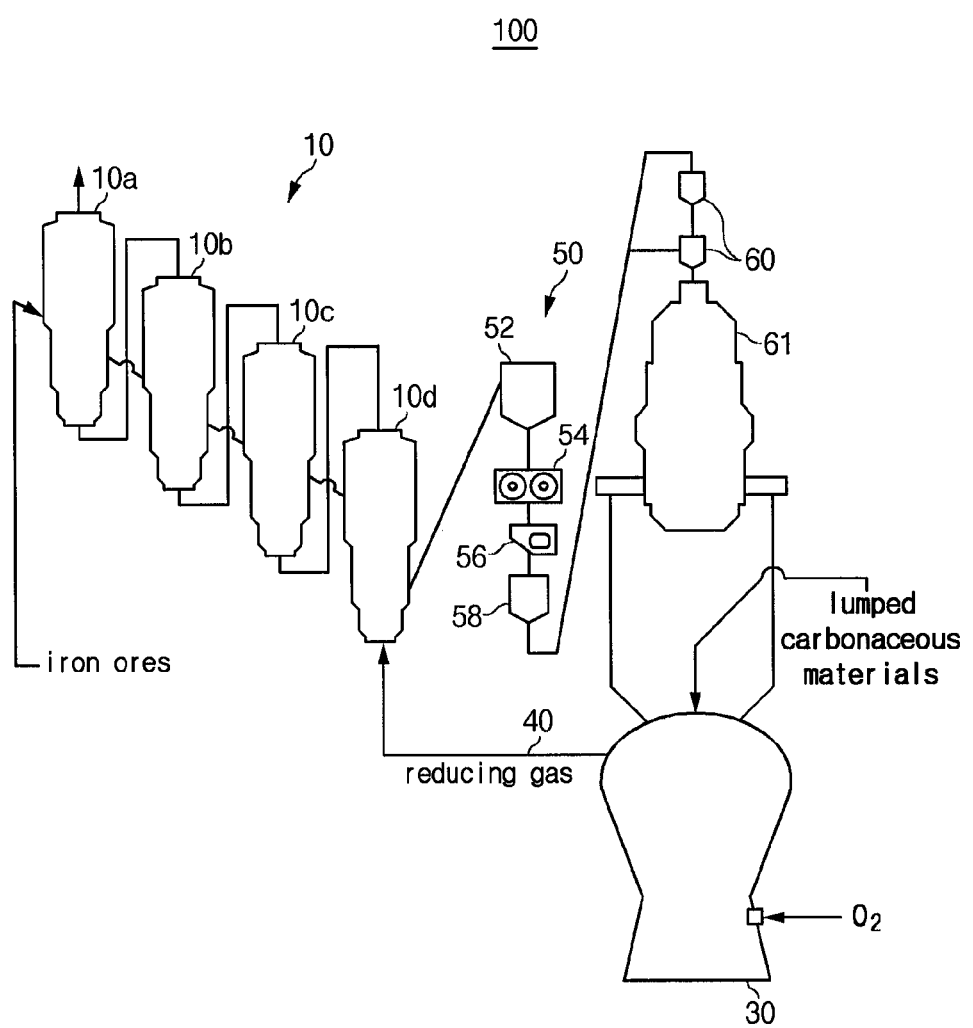
FIG. 1 is a schematic view of an apparatus for manufacturing molten iron according to an exemplary embodiment of the present invention.

FIG. 1 is a schematic view of the molten iron manufacturing apparatus 100 according to an exemplary embodiment of the present invention. The molten iron manufacturing apparatus 100 illustrated in FIG. 1 is merely to illustrate the present invention and the present invention is not limited thereto. Therefore, the molten iron manufacturing apparatus 100 can be modified in other forms.

As shown in FIG. 1, the molten iron manufacturing apparatus 100 mainly includes a fluidized-bed reduction reactor 10 as a reducing furnace, a melter-gasifier 30, and a reducing gas supply line 40.

In addition, the molten iron manufacturing apparatus 100 may further include a compacted iron manufacturing apparatus 50 connecting the fluidized-bed reduction reactor 10 to the melter-gasifier 30, a hot pressure equalizing device 60, and a storage bin 61. The molten iron manufacturing apparatus 100 may include other devices for manufacturing the molten iron.

A fluidized bed is formed in the fluidized-bed reduction reactor 10. Fluidized-bed reduction reactors 10 are sequentially connected to each other to convert the powder ore of the fluidized bed into reduced materials by reducing the powder ore. Each of the fluidized-bed reduction reactors 10 is provided with a reducing gas discharged from a coal packed bed of the melter-gasifier 30 through the reducing gas supply line 40. The fluidized-bed reduction reactor 10 converts the iron ore passing therethrough into reduced materials. The reducing gas is injected to the fluidized-bed reduction reactors 10 and flows therein.

Meanwhile, a plurality of the fluidized-bed reduction reactors can be provided. For example, FIG. 1 shows the fluidized-bed reduction reactors including a pre-heating reducing furnace 10a, a first preliminary reducing furnace 10b, a second preliminary reducing furnace 10c, and a final reducing furnace 10d.

The compacted iron manufacturing apparatus 50 compacts the reduced materials to ensure the ventilation of the melter-gasifier 30. The compacted iron manufacturing apparatus 50 includes a charging hopper 52, a pair of rollers 54, a crusher 56, and a reduced materials storage bin 58. The compacted iron manufacturing apparatus 50 may include other devices as necessary.

The charging hopper 52 stores the reduced materials that are reduced from mixtures containing iron. The pair of rollers 54 manufacture compacted reduced materials by compressing the reduced materials. The crusher 56 crushes the compacted reduced materials into an appropriate size. The reduced materials storage bin 58 temporarily stores the crushed reduced materials.

The hot pressure equalizing device 60 is located between the compacted iron manufacturing apparatus 50 and the melter-gasifier 30. The hot pressure equalizing device 60 is installed above the melter-gasifier 30 to regulate the pressure therein. Since a high pressure is formed in the melter-gasifier 30, the hot pressure equalizing device 60 allows the reduced materials that are crushed to be easily charged into the melter-gasifier 30 by controlling the pressure to be uniform. The storage bin 61 temporarily stores the reduced materials.

A coal packed bed is formed in the melter-gasifier 30 by supplying lumped carbonaceous materials, for example lumped coal or coal briquettes, that are shaped from fine coal. The lumped carbonaceous materials that are supplied to the melter-gasifier 30 are gasified by a pyrolyzing reaction at the upper portion of the coal packed bed and the combustion reaction at the lower portion of the coal packed bed using oxygen. The hot reducing gas generated from the melter-gasifier 30 by the gasifying reaction is generally supplied to the fluidized-bed reduction reactor 10 through the reducing gas supply line 40 that is connected to an end of the final reducing furnace 10*d*. The hot reducing gas is used as a reducing agent and a fluidizing gas.

Figure 2:
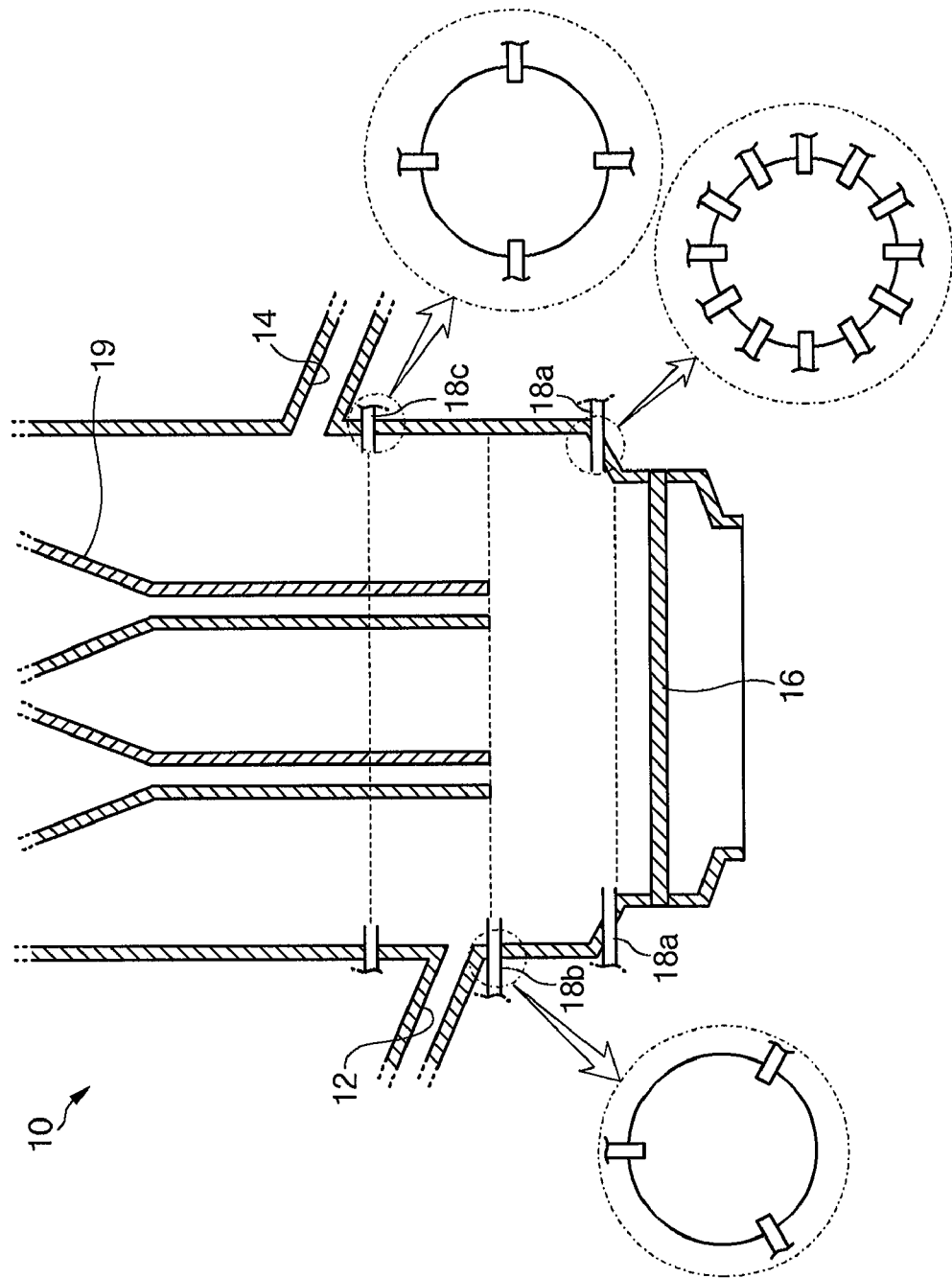
FIG. 2 is a cross-sectional view of a the fluidized-bed reduction reactor according to the exemplary embodiment of the present invention.

The fluidized-bed reduction reactor 10 included in the molten iron manufacturing apparatus 100 according to the exemplary embodiment of the present invention will now be explained in detail. FIG. 2 is an enlarged cross-sectional view of the fluidized-bed reduction reactor 10 shown in FIG. 1.

As shown in FIG. 2, a powder ore charging passage 12 connected to a powder ore discharging passage (not shown) of a reducing furnace (not shown) that is adjacent to the fluidized-bed reduction reactor 10 is formed at a side of the fluidized-bed reduction reactor 10 such that the powder ore is charged into the powder ore charging passage 12.

In addition, a powder ore discharging passage 14 connected to the powder ore charging passage (not shown) of another fluidized-bed reduction reactor (not shown) that is adjacent to the fluidized-bed reduction reactor 10 is formed at the other side of the fluidized-bed reduction reactor 10 such that the powder ore is charged to another reducing furnace 10.

In addition, a distribution plate 16 is formed at a lower portion of the inside of the fluidized-bed reduction reactor 10 such that a uniform flow of the gas and the powder ore is formed in the fluidized-bed reduction reactor 10.

Meanwhile, a plurality of gas injectors 18*a*, 18*b*, and 18*c* are installed above the distribution plate 16.

In the exemplary embodiment of the present invention, the gas injectors 18*a*, 18*b*, and 18*c* include first gas injectors 18*a*, second gas injectors 18*b*, and third gas injectors 18*c*. The first gas injectors 18*a* are arranged at a lower portion of the fluidized-bed reduction reactor 10, that is, just above the distribution plate 16. The second gas injectors 18*b* are arranged around the powder ore charging passage 12, i.e., just below the powder ore charging passage 12. The third gas injectors 18*c* are arranged around the powder ore discharging passage 14, i.e., just below the powder ore discharging passage 14.

The gas injectors 18*a*, 18*b*, and 18*c* may be installed in such a way that the spaces between respective gas injectors 18*a*, 18*b*, and 18*c* are formed to be narrow at a portion at which down streams of the powder ore are concentrated and the spaces are formed to be wide at a portion at which the down streams are weak.

Enlarged circles of FIG. 2 respectively show top views of each of the gas injectors 18*a*, 18*b*, and 18*c* that are arranged to surround the fluidized-bed reduction reactor 10. As shown in the enlarged circles of FIG. 2, the first gas injectors 18*a* are spaced apart from each other by a predetermined distance, and surround the fluidized-bed reduction reactor 10 above the distribution plate 16. The twelve first gas injectors 18*a* are provided in the fluidized-bed reduction reactor 10 at a height that is indicated by a dotted line in FIG. 2.

The first gas injectors 18*a* are arranged at a height where the stagnating layers are most frequently formed in the fluidized-bed reduction reactor 10 to remove the stagnating layers and prevent the stagnating layers from being regenerated.

In addition, the second gas injectors 18*b* are spaced apart from each other by a constant distance, and surround the fluidized-bed reduction reactor 10 below the powder ore charging passage 12. In the fluidized-bed reduction reactor 10 of the exemplary embodiment, the three second gas injectors 18*b* are provided at a height that is represented by a dotted line in FIG. 2. The second gas injectors 18*b* inject the gas into the fluidized-bed reduction reactor 10 near the powder ore charging passage 12 to cause the powder ore to be smoothly charged.

In addition, the third gas injectors 18*c* are spaced apart from each other by a constant distance, and surround the fluidized-bed reduction reactor 10 below the powder ore discharging passage 14. In the fluidized-bed reduction reactor 10 according to the exemplary embodiment of the present invention, the four second gas injectors 18*b* are provided at a height that is indicated by a dotted line in FIG. 2. The third gas injectors 18*c* are arranged at substantially the same height as that of the lower portion of the cyclone 19 provided in the fluidized-bed reduction reactor 10 to smoothly distribute the powder ore discharged from the cyclone 19. That is, the third gas injectors 18*c* are arranged at the same height as that of the lower portion of the cyclone 19 or a height that is close to that of the lower portion of the cyclone 19. The arranging method and number of the gas injectors 18*a*, 18*b*, and 18*c* are not limited to the exemplary embodiment described above, and can be modified depending on various conditions.

Figure 3:
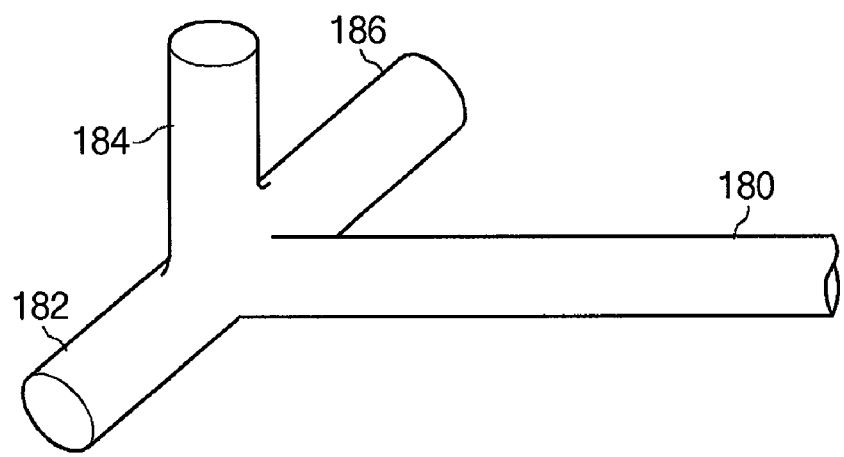
FIGS. 3 and 4 are partial perspective views of gas injectors according to the exemplary embodiment of the present invention.
Figure 4:
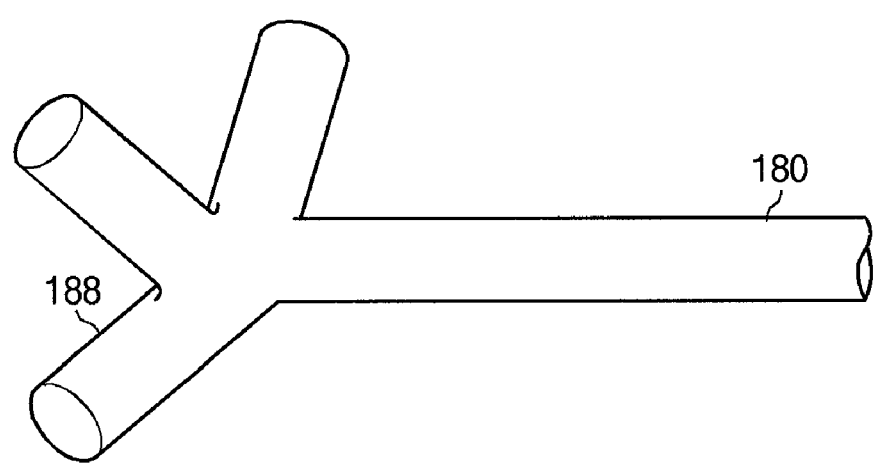

Shapes of the gas injectors 18*a*, 18*b*, and 18*c* will be explained in detail with reference to drawings hereinafter. FIGS. 3 and 4 show gas injectors according to first and second modified embodiments of the present invention respectively.

The structure of the gas injectors described herein is merely to illustrate the present invention, and the present invention is not limited thereto. Since those skilled in the art can easily understand detailed structure of the gas injector except for the nozzle, a detailed description of the gas injector will be omitted hereinafter.

As shown in FIGS. 3 and 4, the gas injector according to the exemplary embodiment is embodied to inject the gas in two or more directions that are different from each other. Thus, the stagnating layers are removed more effectively in the lower portion of the fluidized-bed reduction reactor 10 by the gas injected in each direction, the powder ore are more smoothly charged, and the powder ore can be more effectively distributed.

More specifically, as shown in FIG. 3, the gas injector according to the first modified embodiment includes a gas supply line 180 that supplies the gas from the outside of the fluidized-bed reduction reactor 10, and first, second, and third distribution nozzles 182, 184, and 186 that are extended from the gas supply line 180. In this case, the distribution nozzles 182, 184, and 186 are formed to be perpendicular to each other to inject the gas toward larger areas.

Meanwhile, as shown in FIG. 4, the gas injector according to the second modified embodiment includes a downward distribution nozzle 188 extended from the gas supply line 180 in a downward direction. The gas from the downward distribution nozzle 188 is injected toward falling powder ore such that the powder ore is not piled up in the lower portion of the fluidized-bed reduction reactor 10. Thus, the stagnating layers are more effectively prevented from being formed.

Meanwhile, the above-described gas injector may use one or more gasses among nitrogen, the reducing gas used in the fluidizing reduction process, and a residual gas generated from the apparatus for manufacturing molten iron and so on by recycling and mixing them.

An experimental example for confirming the effect that restrains formation of an inner stagnating layer will be described hereinafter. The experimental example is merely to illustrate the present invention, and the present invention is not limited thereto.

Experimental Example

Twenty three gas injectors in total were installed in the experimental example. That is, sixteen gas injectors were installed at a height of 350 mm above the distribution plate, three gas injectors were installed at a height of 1100 mm thereabove, and four gas injectors were installed at a height of 1400 mm thereabove. The temperature was measured during the operation of the fluidized-bed reduction reactor. Further, the temperature of a fluidized-bed reduction reactor in which the gas injectors were not installed was measured as a comparative example.

Figure 5:
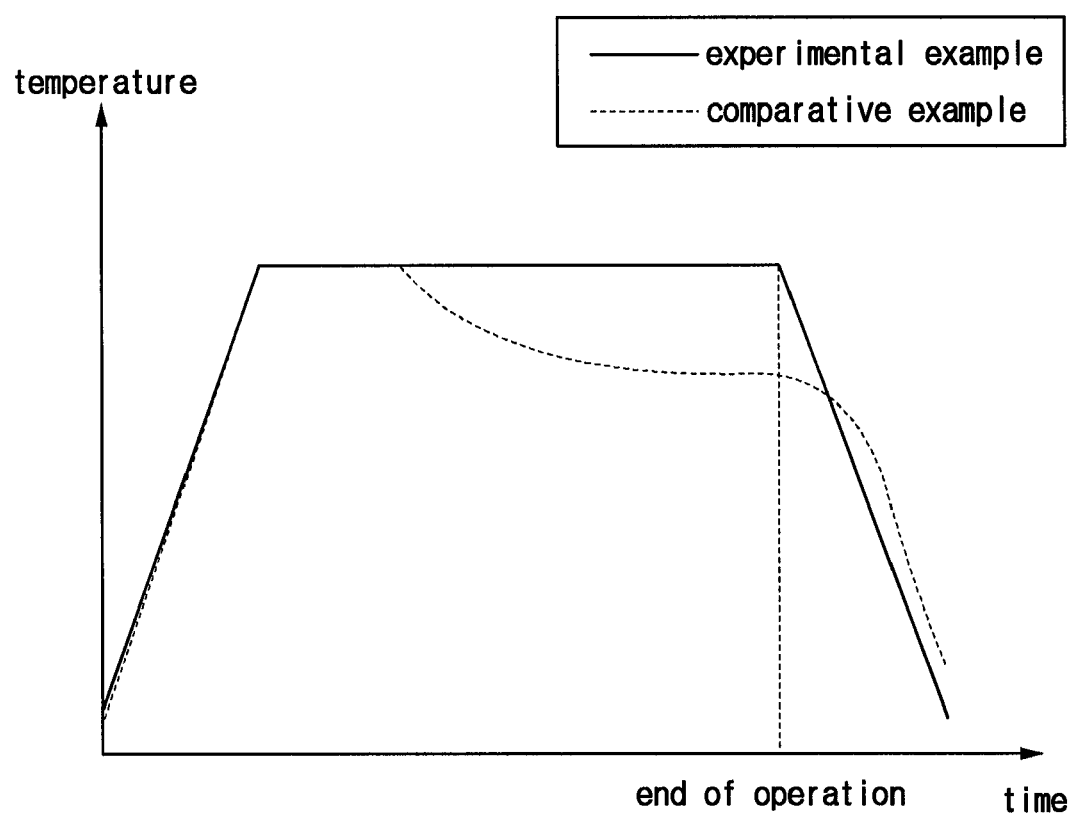
FIG. 5 is a graph showing changes in temperatures according to an experimental example and a comparative example of the present invention during the operation of the fluidized-bed reduction reactor.

FIG. 5 shows results of measurements of change of temperature in the experimental example and the comparative example, respectively. Referring to the drawing, the temperature of the fluidized-bed reduction reactor according to the experimental example rose at a constant rate as the operation proceeded, was maintained at a uniform temperature, and dropped at a constant rate as the operation ended.

On the other hand, in the comparative example, the temperature rose at a constant rate during the initial operation like the experimental example, but as the predetermined time elapsed the temperature gradually dropped below the temperature of the experimental example before the operation was ended such that a temperature difference occurred. After the operation was ended, the temperature dropped. However, as a certain time went by, the temperature rose above the temperature of the fluidized-bed reduction reactor of the experimental example.

That is, in the case of the experimental example in which the gas injectors were installed, the stagnating layers were not formed during the operation such that the fluidization of the powder ore and the gas were uniformly maintained. Thus, the difference of the temperatures depending on location hardly occurred. On the other hand, in the case of the comparative example, the fluidization of the powder ore and the gas became non-uniform due to the formation of the stagnating layers. Thus, temperature differences depending on location occurred, and the comparative example shows a higher temperature than that of the experimental example after the operation was ended due to the heat conservation effect of the stagnating layers.

From the results described above, it can be confirmed that the formation of the stagnating layers was restrained by the gas injected from the gas injectors installed in the fluidized-bed reduction reactor.

Although exemplary embodiments of the present invention have been described in detail hereinabove, it should be clearly understood that many variations and/or modifications of the basic inventive concept taught herein still fall within the spirit and scope of the present invention, as defined by the appended claims and their equivalents.

The invention claimed is:

1. An apparatus for manufacturing molten iron, the apparatus comprising:
   at least one fluidized-bed reduction reactor that converts iron ore into reduced materials by reducing and plasticizing the iron ore;
   a melter-gasifier into which the reduced materials are charged and oxygen is injected such that the melter-gasifier manufactures molten iron; and
   a reducing gas supply line that supplies a reducing gas discharged from the melter-gasifier into the fluidized-bed reduction reactor via a distribution plate in the fluidized-bed reduction reactor,
   wherein the fluidized-bed reduction reactor comprises a gas injector that injects a gas into the fluidized-bed reduction reactor to remove stagnating layers,
   wherein the gas injector comprises:
   a plurality of first gas injectors that are arranged above the distribution plate to remove the stagnating layers formed at a lower portion of the fluidized-bed reduction reactor,
   a plurality of second gas injectors that are arranged above the first gas injector and below a powder ore charging passage to allow the powder ore to be smoothly charged, and
   a plurality of third gas injectors that are arranged above the second gas injector and below a powder ore discharging passage and that distribute the powder ore.

2. The apparatus of claim 1, wherein the gas injector injects the gas in two or more directions that are different from each other.

3. The apparatus of claim 2, wherein the gas injector comprises:
   a gas supply line that supplies the gas into the fluidized-bed reduction reactor; and
   a plurality of distribution nozzles that are connected to the gas supply line, and that inject the gas in directions that are different from each other.

4. The apparatus of claim 3, wherein the gas injector comprises:
   a first distribution nozzle that is formed to be perpendicular to the gas supply line and the first distribution nozzle; and
   a third distribution nozzle that is formed to be perpendicular to the gas supply line and the second distribution nozzle.

5. The apparatus of claim 3, wherein the gas injector comprises a downward distribution nozzle that is inclined in a direction extended from the gas supply line to the lower portion of the fluidized-bed reduction reactor.

6. The apparatus of claim 1, wherein the plurality of the gas injectors are spaced apart from each other with a predetermined distance therebetween, and that surround the fluidized-bed reduction reactor.

7. The apparatus of claim 6, wherein the fluidized-bed reduction reactor comprises:
   a powder ore charging passage that charges the powder ore thereinto, the powder ore charging passage provided in one side of the fluidized-bed reduction reactor; and
   a powder ore discharging passage that discharges the powder ore therefrom, the powder ore discharging passage provided in the other side of the fluidized-bed reduction reactor.

8. The apparatus of claim 7, wherein the fluidized-bed reduction reactor further comprises at least one cyclone that collects fine ore therein, and the third gas injectors are installed at substantially the same height as the height of the lower end portion of the cyclone.

9. The apparatus of claim 1, wherein the gas comprises at least one gas selected from the group consisting of nitrogen, the reducing gas, and a residual gas generated from the apparatus for manufacturing iron.

* * * * *

UNITED STATES PATENT AND TRADEMARK OFFICE
CERTIFICATE OF CORRECTION

PATENT NO. : 8,119,059 B2  
APPLICATION NO. : 12/158926  
DATED : February 21, 2012  
INVENTOR(S) : Min-Young Cho et al.

Page 1 of 1

It is certified that error appears in the above-identified patent and that said Letters Patent is hereby corrected as shown below:

Column 8, Lines 28-29, Claim 4, delete "supply line and the first distribution nozzle; and" and insert -- supply line;
 a second distribution nozzle that is formed to be perpendicular to the gas supply line and the first distribution nozzle; and --

Signed and Sealed this
Twenty-ninth Day of May, 2012

David J. Kappos
*Director of the United States Patent and Trademark Office*